(No Model.) 6 Sheets—Sheet 1.

F. P. SLANE & C. O. SOBINSKI.
PRINTING MACHINE.

No. 563,422. Patented July 7, 1896.

(No Model.) 6 Sheets—Sheet 2.

F. P. SLANE & C. O. SOBINSKI.
PRINTING MACHINE.

No. 563,422. Patented July 7, 1896.

Witnesses
Alfred A. Mathey
W. B. Hill

Inventors
F. P. Slane and
C. O. Sobinski
By their Attorneys
Keller & Stacer

THE NORRIS PETERS CO., PHOTO-LITHO., WASHINGTON, D. C.

(No Model.) 6 Sheets—Sheet 3.

F. P. SLANE & C. O. SOBINSKI.
PRINTING MACHINE.

No. 563,422. Patented July 7, 1896.

Witnesses
Alfred A. Mathey
W. B. Wicks

Inventors
F. P. Slane and
C. O. Sobinski
By their Attorneys
Keller & Stanek

(No Model.) 6 Sheets—Sheet 4.

F. P. SLANE & C. O. SOBINSKI.
PRINTING MACHINE.

No. 563,422. Patented July 7, 1896.

Witnesses
Alfred A. Mathey
W. B. Wills

Inventors,
F. P. Slane and
C. O. Sobinski.
By their Attorneys
Keller & Starek

(No Model.) 6 Sheets—Sheet 5.

F. P. SLANE & C. O. SOBINSKI.
PRINTING MACHINE.

No. 563,422. Patented July 7, 1896.

Witnesses
Alfred A. Mathey
W. B. Weels

Inventors
F. P. Slane and
C. O. Sobinski
By their Attorneys
Keller & Starek (No Model.) 6 Sheets—Sheet 6.

F. P. SLANE & C. O. SOBINSKI.
PRINTING MACHINE.

No. 563,422. Patented July 7, 1896.

Witnesses
Alfred A. Mathey

Inventors
F. P. Slane and
C. O. Sobinski
By their Attorneys
Keller & Starek

UNITED STATES PATENT OFFICE.

FRANK P. SLANE AND CHARLES O. SOBINSKI, OF ST. LOUIS, MISSOURI.

PRINTING-MACHINE.

SPECIFICATION forming part of Letters Patent No. 563,422, dated July 7, 1896.

Application filed April 20, 1895. Renewed December 7, 1895. Serial No. 571,442. (No model.)

*To all whom it may concern:*

Be it known that we, FRANK P. SLANE and CHARLES O. SOBINSKI, citizens of the United States, residing at St. Louis, State of Missouri, have invented certain new and useful Improvements in Printing-Machines, of which the following is a full, clear, and exact description, reference being had to the accompanying drawings, forming a part hereof.

Our invention has relation to improvements in printing-machines; and it consists in the novel arrangement and combination of parts more fully set forth in the specification and pointed out in the claims.

In the drawings, Fig. 27 is a detail showing the wedge-shaped tips for separating any pair of type-bars.

The object of our invention is to construct a printing-machine which shall be applicable to general office use, the same to take the place of devices now generally in vogue for reproducing several copies of the same letter or circular, as, for example, the hectograph, mimeograph, and the like. With our present improvement the circular is printed from individual type-characters set up for the purpose, one or more lines of type thus set up being consecutively impressed on the sheet which is to constitute the letter or circular, the individual characters of each line of type being also impressed consecutively during the printing operation, as will more fully hereinafter appear.

The invention in general consists of a rotating cylinder along the periphery of which the lines of type are set and from which the impressions can be taken; of a reciprocating rider carrying an impression-roller adapted to sweep in the path of each line of type set up and making thus an impression of the line over which it sweeps upon any suitable sheet of paper interposed between the roller and the type-line; of suitable type-bars disposed about or constituting the periphery of the cylinder, between each pair of which bars the type is temporarily held; of suitable means for rotating said cylinder so as to present a new line of type in contact with the reciprocating rider; of suitable devices for returning the cylinder back to its original position after the completion of any letter or circular; of suitable retarding devices for checking the velocity of the returning cylinder; of suitable devices for indicating at a glance the number of lines set up in the process of composing a letter; of suitable devices for holding the cylinder stationary during the setting of the type; and of other and further details to be hereinafter more specifically referred to. In detail the device may be described as follows:

We will first describe the mechanism by which the reciprocating rider carrying the impression-roller which coöperates with the type is operated and the mechanism by which the type-cylinder is intermittently advanced one line with each reciprocation of said rider, and in this connection reference will be made particularly to Figs. 1 to 12, inclusive.

Referring to the drawings, 1 represents an ordinary case having a series of compartments 2 for holding various type-characters. Between the standards 3 at the end of the case is mounted the revoluble type-cylinder 4. Between suitable brackets or arms 5 on opposite sides of the case and in line with the axis of the cylinder are mounted rollers 6, over which is adapted to pass, underneath the cylinder, an ink-ribbon 7, being advanced in any mechanical manner, (not shown,) said ribbon device forming no part of the present invention, as the same is old and well known.

Mounted within suitable bearings in the side walls of the case and at a suitable distance below the periphery of the type-cylinder is an oscillating cylinder 8, having spiral peripheral slots 9 9, traversing the full peripheral length of the cylinder, and having each a point of beginning and ending one hundred and eighty degrees diametrically opposite one from the other, the two spirals being in fact one hundred and eighty degrees apart throughout their full length. Over this oscillating cylinder is adapted to reciprocate back and forth along the said spiral guides a rider 10, which embraces the oscillating cylinder, and which rider has disposed along its inner surface two pairs of antifriction-rollers 11 11, each pair being in proper alinement to conform to the pitch of the spiral slots 9, within which the said rollers operate and within which they are guided. The outer surface of the rider is provided with a fork 12, which is guided within a suitable guideway 13 of the upper transverse plate 14 of the type-case during the reciprocation of the rider. Between the members of this fork is mounted an impression-roller 15, which is adapted to come in contact and operate against the under surface of the traveling ribbon 7 above referred to, pressing said ribbon against the surface of the type-cylinder. The rider is additionally guided by the rollers 38, operating within the slotted guide-plate 29. As the cylinder 8 is oscillated in one direction the rider 10 will travel along the spiral slots first one way, and when the cylinder 8 is oscillated in the opposite direction the rider will travel in the reverse direction along said cylinder, in this way causing the impression-roller 15 to roll along the peripheral type carried by the type-cylinder, as hereinafter more fully set forth. When the rider has reached one end of the oscillating cylinder 8, it is assisted on its return trip by the resilient spring buffer-arms 16, secured to the inner surface of the side wall of the type-case, as shown best in Figs. 4 and 7.

Having described the manner of reciprocating the rider, it is now in order to describe the mechanism for oscillating the cylinder 8 by which the reciprocation is effected. Mounted in one of the side walls in the rear of the type-case is a pinion 17, adapted to be rotated by an operating-handle 18, secured to the shaft of said pinion. The pinion meshes with the teeth of a gear-wheel 19, mounted at a suitable distance below it. The gear-wheel 19 acts as a crank-disk for imparting a reciprocating motion to a rack-bar 20, a pin 21 pivotally securing the end of the rack-bar to the gear-wheel 19, and the same pin also pivotally connecting the terminal crank-arm 22 of a transverse shaft 23, mounted to one side of the oscillating cylinder 8, to the said gear-wheel 19. The free end of the rack-bar 20 carries an antifriction-roller 24, which is adapted to ride in the looped guideway 25, first riding along one branch 25$^a$ of the loop, and then returning by the other branch 25$^b$ to the point of beginning, the reciprocation of the rack-bar being effected, of course, as a result of its pivotal connection with the gear-wheel 19. As the rack-bar is forced along the branch 25$^a$ its teeth engage with the terminal pinion 26, (see Fig. 4,) carried at one end of the oscillating cylinder 8, thus rotating the said cylinder in one direction and causing the rider to be forced in one direction. As the rack-bar is drawn back along the loop or branch 25$^b$, that is to say, while it is being reciprocated in the opposite direction, the said bar will revolve or oscillate the cylinder 8 in the opposite direction, causing the rider to travel in a reverse direction. This of course can be repeated indefinitely.

It will be observed that the rack-bar 20 is kept in constant engagement with the pinion 26 whatever be the position of its free end in the guideway 25, since, in proportion that its free end may be depressed or elevated, the pivotal end thereof carried by the gear-wheel 19 is elevated or depressed, so that a constant engagement between the two is effected. To assist the free end to better pass the angle 27 of the loop after it has reached said point, we form in one of the terminal arms 28 of a slotted bottom brace or guide plate 29 a suitable cavity, within which is mounted a resilient coiled spring 30, on the top of which rests a pin 31. The resiliency of the spring 30 causes the upper end of the pin to press upward against the rack-bar, thus assisting it to pass the angle of the loop above referred to. To prevent the free end of the rack-bar from any tendency toward retracing its path along the branch 25$^b$ after it once reaches or has passed the angle 27, we mount a suitable latch 32, having a slot 33, through which passes a pin or screw 34, permitting said latch to move or play along said pin. The free end of the latch is beveled, the beveled edge facing the branch 25$^b$, allowing the roller of the rack-bar to pass the latch in one direction in its passage around the angle, shoving the latch backward, the latter being immediately returned to its normal position by the free end of a spring-arm 35 bearing against the rear end of the latch and thus locked against any tendency of the rack-bar to retrace its steps.

During the operations above referred to the shaft 23 is constantly rotated by reason of its connection with the gear-wheel 19 through the medium of the arm 22. The opposite end of the shaft 23 carries adjacent to the bearing at that end two diametrically opposite extending arms 36. During the rotation of the shaft 23 the rounded end of each arm comes in contact with and raises the vertically-reciprocating feed-bar 37, mounted in the top transverse rear plate 14 of the type-case. To reduce the friction between the parts, a roller 39 is carried at the lower end of the feed-bar, which latter after it has been raised by one of the arms 36 is returned to its normal position by a spring 40, confined between a projecting finger 41 on said bar and the base of a suitable opening of the plate 14 in which the spring is located. To the feed-bar and above the plate 14 is pivoted a pawl 42, the pivotal point of the pawl being immediately above an offset 43 made in the feed-bar to have the pawl approximately flush with the outer surface of the bar. A spring metallic strip 44 is riveted at one end to the side of the pawl, the free end of the strip carrying an inwardly-projecting locking-pin 45, which passes into alining openings of the pawl and the upper end of the feed-bar. In this manner the pawl 42 is firmly locked into position on the feed-bar when it is desirable to hold the said pawl out of engagement with its ratchet to be presently referred to. To unlock the same from the feed-bar, the free end of the spring-strip 44 is pulled out slightly to withdraw the inner end of the pin 45 out of the opening in the feed-bar, when the pawl will be free to tilt about its pivotal point on said bar. When thus free, it is held in engagement with the ratchet 46, carried at one end of the type-cylinder 4, by the free end of a spring-arm 47, secured to the feed-bar. With every revolution of the shaft 23 the arms 36 will raise the feed-bar twice, thus advancing the type-cylinder 4, carrying the ratchet-wheel 46, twice or two spaces, and as one tooth of the ratchet-wheel corresponds to one type-line on the type-cylinder, it is obvious that the type-cylinder will be advanced one line for each reciprocation of the rider carrying the impression-roller 15, that is to say, the impression-roller will travel along one type-line with each reciprocation thereof.

Figure 15:
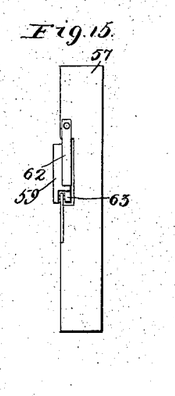
Fig. 15 is a top plan view of the cup detached, showing the pawl-carrying lever pivoted thereto and the spring-plate controlling the same.
Figure 16:
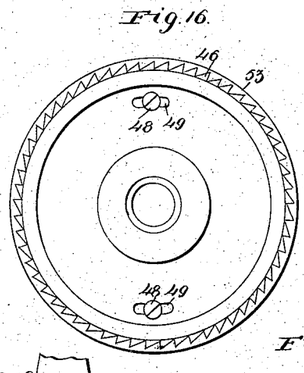
Fig. 16 is an end view of the ratchet-wheel, showing the means for adjustably securing the same to the disk referred to in connection with Fig. 13.
Figure 17:
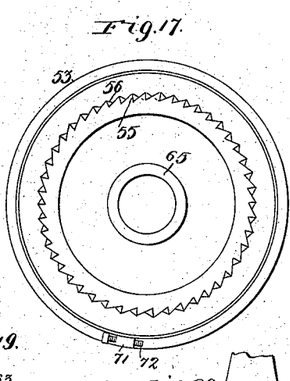
Fig. 17 is a side view corresponding to the side view in Fig. 14, but with the cup shown in Fig. 15 removed, thus disclosing an end view of the oppositely-tending series of ratchet-teeth carried by the inwardly-projecting flange of the disk.
Figure 19:
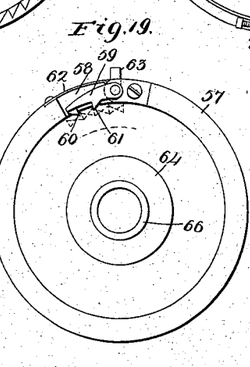
Fig. 19 is an inner side view of the detached cup illustrated in Fig. 15.

The terminal feed ratchet-wheel 46 for the type-cylinder is secured by screws 48, passed through elongated curved slots 49, to a disk 50, which has a peripheral groove 51 for the reception of the pegs 52, movably securing the band 53 to said disk, the band by this arrangement being free to rotate about the periphery of the disk, the pegs 52 serving as guides for said band; or, if the band be held stationary, then the disk with its ratchet-wheel 46 can be rotated freely within the band. Formed integrally with the disk 50 at a suitable distance from the periphery is an inwardly-projecting flange 54, along the outside of which are disposed two adjacent series of ratchet-teeth 55 and 56, tending, respectively, in opposite directions, the free edges of each adjacent pair being in alinement. Over said teeth is adapted to pass a cup 57, along the peripheral wall of which is cut an opening 58, at one end of which is pivoted a lever 59, (see Figs. 15 and 19,) having an inwardly-projecting terminal pawl 60, which engages with the ratchet series 55, and a medial inwardly-projecting pawl 61, simultaneously engaging with the series 56. The pawls are kept in engagement by the free end of a spring-plate 62, secured to the wall of the cup at one end of the opening 58, spanning the latter and bearing downward with its free end against the outer surface of the lever 59 adjacent to its pivotal point.

Forming a part of the lever 59 and disposed about the pivotal point of the said lever and projecting above the periphery of the cup is a tripping-arm 63, (the lever 59 and arm 63 acting as a bell-crank lever,) which, when struck from the side adjacent to the spring-plate 62, tilts the pawls carried by the lever 59 simultaneously out of engagement with the said ratchet series. While the pawls are in engagement, however, the cup 57 is temporarily and rigidly secured to the disk 50, and when the latter with its ratchet-wheel 46 revolves the cup will revolve with them. When the pawls 60 and 61 are disengaged, however, then the cup carrying them is free to rotate about the toothed periphery of the flange 54 of the disk 50, the inwardly-projecting annular shoulder 64 of the cup bearing against the inner shoulder 65 of the disk 50, the extension 66 of the shoulder projecting a slight distance into the central opening of the disk 50. Passing through the central openings of the ratchet-wheel 46, disk 50, and cup 57, thus assembled, is a shaft 67, which forms the general supporting-shaft for the type-cylinder. Over said shaft loosely passes a core or sleeve 68, about which the type-bars are assembled, as subsequently to be explained. The core is interiorly screw-threaded at each end, and at the end now under consideration a hollow screw 69 is passed over the shaft, said screw being screwed into the core. The binding-screw 69 has a smooth portion about which is mounted the cup 57 above referred to, the said cup being firmly clamped to the core by causing the head 70 of the binding-screw to come squarely against the extension 66 of the cup. In this way the cup becomes securely locked between the end of the core and the inner surface of the head of the binding-screw, and as the latter is screwed to the core, these parts when assembled move as a unit. The head of the binding-screw plays loosely, of course, within the central openings of the ratchet-wheel 46 and the disk 50. So long, therefore, as the pawls 60 and 61 remain in engagement with the ratchet series 55 and 56 the feed ratchet-wheel 46, disk 50, cup 57, and core 68 will revolve as a unit about the common supporting-shaft 67. When the pawls 60 and 61 are disengaged, then the cup 57, to which they are secured, and the core connected to the cup have a motion on the shaft 67 independent of the ratchet-wheel 46 and disk 50.

The purpose of the disengagement is to be explained hereinafter; but at present it is sufficient to explain the mechanism by which the disengagement is effected. Projecting from the lateral inner edge of the band 53 or that edge adjacent to the cup carrying the pawl-lever 59 is a projecting lug 71, through which passes an adjustable pawl-releasing screw 72, whose projecting end is adapted to come in contact with or strike at suitable intervals, as subsequently explained, the inner face of the tripping-arm 63, forming part of the pawl-lever 59, thus tilting the pawls 60 and 61 of said lever out of engagement with their respective series of ratchet-teeth disposed about the flange 54. As explained before, the effect of a disengagement of the cup 57 from the teeth on the flange of the disk 50 is to permit the said cup to rotate in either direction about said disk, and during the period of disengagement can in fact rotate in a direction reverse to that in which the ratchet-wheel 46 is being fed. The band 53 has a series of peripheral depressions 73, having suitable ordinals from "1" upward disposed between them, (in the present case from "1" to "44," corresponding to the number of peripheral type-bars constituting the type-cylinder.) By means of these depressions the band can be locked against rotation by the locking-pin 74, carried by the lower projecting end of a vertically-movable post 75, carried by an inwardly-projecting arm 76, secured to the standard 3 on one side of the machine. The post 75 carries a lateral-projecting peg 77, which, when the post is pulled outwardly out of engagement with the depressions in said band, is adapted upon a slight turning of the post to rest in the horizontal branch of a right-angled passage 78, cut in the arm 76, and thus temporarily hold the post 76 out of engagement with the band 53, so that while the band 53 is held against rotation by the post 76 the ratchet-wheel 46 and disk 50 are free to rotate within the band, it being understood, of course, that the cup 57 and the core 68, to which it is secured, will also rotate with the disk 50 so long as the pawl-lever 59 remains in engagement with the ratchet-teeth of said disk, and it being further understood that the several parts are loosely mounted on the shaft 67. To the opposite end of the core 68 is secured a cup 79 similar to the cup 57 and held to the core in a similar manner, that is to say, by means of a hollow binding-screw 80 similar to the binding-screw 69, passed over the end of the shaft 67 and screwed into the end of the core 68 with the lower surface of the head 81 thereof firmly against the annular base 82, surrounding the central opening of the cup.

With the understanding that the cups 57 and 79 are firmly secured to the core 68 it will be convenient to describe the construction by which the type-bars, which together with the cups and core constitute the type-cylinder, are secured to the said core 68. Disposed along the major portion of the periphery of the core 68 (say, for example, about three-fourths or five-sixths of the entire outer periphery) are a series of parallel longitudinal radiating slits 83, in each of which is securely fastened and held between the walls thereof by a series of spring supporting-arms 84 a type-bar-supporting plate 85, having a continuous basal shoulder 86 along a line at which the arms 84 begin. Running the full length of each plate approximately midway between the shoulder 86 and the upper edge of the plate and on the side facing the shoulder is a ridge 87. To the reverse sides of the plates 85, that is, to the sides opposite the ridges 87, is secured by brazing or otherwise a longitudinal type-bar 88 of suitable width, each type-bar having a series of parallel bevel grooves or depressions 89 (see Fig. 1) formed along the outer surface thereof and throughout its entire width. The several type-bars are each provided at their opposite ends with blocks 90, having inclined edges 91 on the side adjacent to the grooves 89. Each block has a depression 92, adapted to receive the ridge 87 of its neighboring type-bar-supporting plate. The terminal blocks 90, too, keep the several type-bars properly separated from one another.

Figure 6:
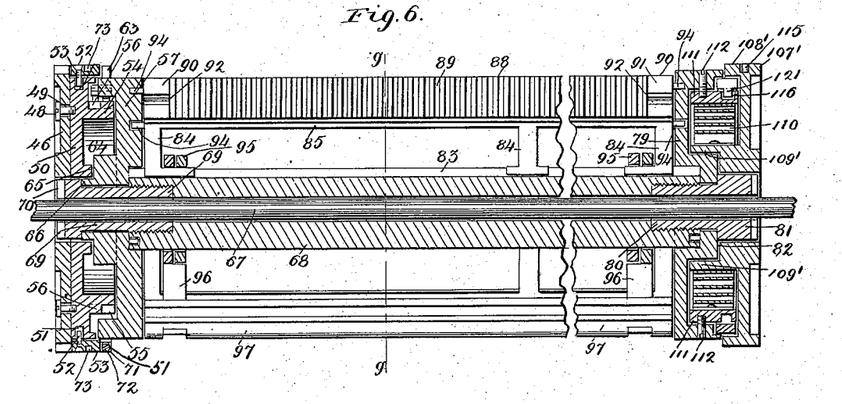
Fig. 6 is an enlarged longitudinal section on $c\,c$ of Fig. 4, taken through the type-cylinder only.
Figures 23, 24:
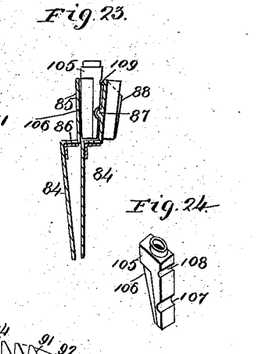
Fig. 23 is a detail cross-section taken through two consecutive type-bars, showing the manner of introducing the type.
Fig. 24 is a perspective view of the type.

By the arrangement just described an almost complete cylinder of type-bars is formed, that is, the type-cylinder thus formed is complete with the exception of the open space or segment 93 opposite the smooth portion of the core, or that portion of said core not provided with slits. The series of type-bar-supporting plates carried by their arms 84 being springy, any pair can be slightly separated from each other, so as to freely permit the insertion of any suitable type into the grooves 89 of each type-bar, as best seen in Fig. 23; but, since in the spreading of any pair of type-bars from one another a tendency might arise to unequally distribute the strain consequent upon such separation, we reinforce the entire series of type-bar-supporting plates by securing the middle one of the series at either end to the cups 57 and 79, respectively, by pins 94, fitting into suitable depressions in the cups, as best seen in Fig. 6. To further reinforce the series of supporting-plates along the terminal plates of the series, we make the following provision: At either end of the core 68, adjacent to the terminal spring-arms 84, there loosely embrace the core two juxtaposed collars 95, from each of which projects a rigid arm 96, the basal portion of each arm overlapping the periphery of the adjacent ring. (See Fig. 6.) To the top of each alining pair of these arms is secured a brace-bar 97 of a construction similar to the combined type-supporting plate and type-bar. Now, the collars 95 being loose upon the core and free to rotate about the same, it is obvious that the arms 96 of each adjacent pair of collars can be made to shut or open from each other on the principle of scissor-blades, and consequently the brace-bars 97, carried by the respective arms, can be moved toward or from each other and consequently to and from the terminal type-bars constituting the series of the open type-cylinder. When the brace-bars are opened out to their full extent, they bear against the adjacent surfaces of the terminal supporting-plates and type-bars of the series, and are held braced against them by the detachable spring-plates 98, inserted into depressions of the respective brace-bars. (See Fig. 26.)

Figure 18:
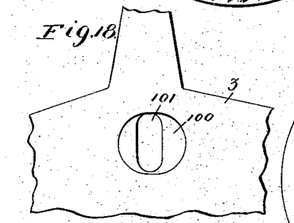
Fig. 18 is a side view of a portion of the side standards of the case, showing the elliptical bearing and elongated opening for the reception of one end of the main supporting-shaft for the type-cylinder.
Figure 20:
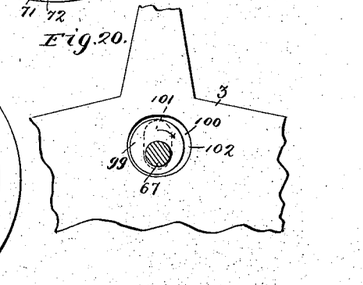
Fig. 20 is a view similar to Fig. 18, showing in addition the cam-supporting ends for the main shaft, and also the end of such shaft in section.

As above stated, in order to insert the type between the several type-bars they must be separated sufficiently to allow for a free and easy insertion of the type into the respective depressions 89. This is accomplished as follows: During the operation of the machine, and under ordinary circumstances, the supporting-shaft 67 is stationary. It can, however, be turned within its bearings, and is supported at either end by the circular disks 99, being mounted and secured eccentrically to the same, the said disks resting within elliptical depressions 100, formed in the walls of the standards 3 at either end of the machine, the said elliptical depressions terminating along the outer surface of the walls of the standards in vertically-elongated narrow guide-slots 101, through which the free ends of the shaft 67 pass. The guide-slots 101 are not centrally disposed relative to the elliptical depressions 100, but lie a trifle to one side of the center thereof, as best seen in Fig. 18, so that when the supporting-disk carrying the shaft 67 is inserted into its elliptical supporting depression a slight space 102 (the width thereof depending on the degree of eccentricity in the mounting between the shaft 67 and disk 99) is formed to allow for the lateral play of the disk 99 when the shaft 67 is turned in the direction indicated by arrow in Fig. 20, that is to say, when turned from the observer facing the type-case. Rotating the shaft 67 therefore, as stated, will permit the disks 99 supporting it to rotate freely (in one direction) within the depressions 100, and being mounted eccentrically within the disks 99 the said shaft will be raised vertically an amount equal to its eccentric distance from the center of rotation of the disks, and in its vertical movement it will be guided by the side walls of the elongated slots 101. The object of having the slots to one side of the center of the depressions 101 is apparent: it allows for the rotation of the disks 99, permitting the shaft itself to move vertically only. If the slots were disposed concentrically with the depressions, then upon rotation of the shaft 67 the latter would move not only vertically but also in the arc of a circle, (which is true of every eccentric,) but in the present case the circular component of the compound motion is absorbed by the lateral play the disk has in one direction in its elliptical supporting depression, permitting the shaft itself to move only in a vertical and rectilinear line. The shaft 67 with its core and type-cylinder and other operating parts is thus raised and lowered by the operating-handle 103. Depending from the inwardly-projecting arm 76 on one side of the machine, and from a similar inwardly-projecting arm 76' on the opposite side, and located each at a point above the type-cylinder directly over the row of terminal blocks 90 of the type-bars, are wedge-tipped fingers 104. As the type-cylinder is raised, as above indicated, these wedge-tipped fingers are adapted to come simultaneously at both ends of the machine between any pair of blocks 90, spreading them apart a suitable distance (see Fig. 27) and thus spreading apart the particular pair of type-bars between them, and enabling the operator to freely insert the individual type into the depressions of the type-bars formed for their reception. (See Fig. 23.)

Figures 25, 26:
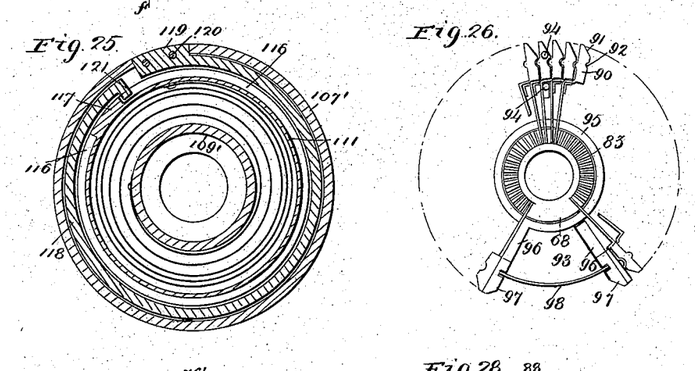
Fig. 25 is a section on $f\,f$ of Fig. 21.
Fig. 26 is an end view of the type-cylinder, showing a few of the type-bars.
Figure 28:
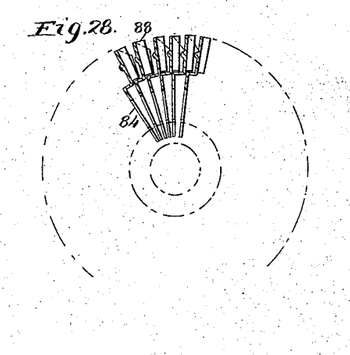
Fig. 28 is a section on $g\,g$ of Fig. 6.

The depressions 89 of the type-bars serve, of course, to space the type, the ridges 87 of the type-bar-supporting plates serving on the other hand to hold the type 105, the body of which has a beveled edge 106 to enter the depressions 89, and having in addition a depression 107 near the lower front portion of the base adapted to embrace the ridge. The type has an additional upper depression 108 to embrace a terminal ridge 109 of the type-bar-supporting plate. (See Fig. 23.) By this means the operator will always insert the type properly on the type-surface of the cylinder, so that to set any line of type the operator raises the type-cylinder 4 by turning the handle 103 in the proper direction, (adjusting the type-cylinder beforehand, so as to make sure that the wedge-tipped fingers will enter between any alining pair of blocks 90,) thus spreading the type-bars sufficiently apart to permit the ready and positive insertion of the type. When one line is set up, the cylinder is lowered by reversing the direction of the operating-handle 103. The cylinder is then advanced one space to bring the next type-line immediately under the fingers 104. The cylinder is again raised to duly separate the next pair of type-bars and the second line of type is set up. This can be repeated as often as the length of the letter or communication demands. Inasmuch as the type-cylinder normally revolves in a direction from the operator in front of the type-case, the first line of type is always set up between the type-bars immediately adjacent to the left-hand end of the open segment 93, as seen in Fig. 26. In setting the type on the type-cylinder the pawl 42, operating the ratchet-wheel 46 of the cylinder, is generally thrown out of engagement with the teeth of said ratchet, as heretofore explained, the cylinder being periodically rotated by hand the necessary number of spaces or lines until the letter or communication is completed or set up. After a certain number of lines of type have been set up the type-cylinder is turned back, so that the first line set up may come directly over the impression-roller 15, carried by the rider, which is driven to its extreme position along the cylinder 8. The pawl 42 is brought into engagement with the ratchet 46, which is carefully adjusted to the disk 50 by the screws 48, passing through the slots 49, so that the teeth thereof may come in alinement with the double series of ratchet-teeth on the flange 54 of the said disk. When, for example, only one line of type has been set up and is to be printed, then the band 53, carrying the adjustable screw 72, is set (the band being loose on the disk 50) so that the free or striking end of said screw is in contact with the adjacent surface of the tripping-arm 63 of the pawl-lever 59 by the pawls 60 and 61 of which the type-cylinder is kept in engagement with the disk 50, secured to the ratchet-wheel 46. With the parts so adjusted the band 53 is set or locked by inserting the locking-pin 74 of the post 75 into one of the peripheral depressions 73, as already explained. If now the handle 18 be turned, so as to impart motion to the gear-wheel 19, the latter through the intermediate connections already described will oscillate the cylinder 8 and reciprocate the rider and its impression-roller back and forth along said cylinder, and if a sheet of paper be interposed between the ink-ribbon and the type-cylinder the roller will impress the line of type thus set up on said sheet of paper.

Figure 14:
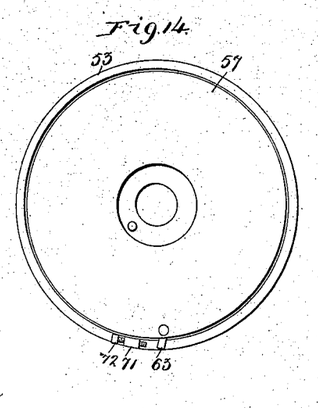
Fig. 14 is a side view of the parts, showing the adjustable screw carried by the number-band in position to coöperate with the tripping-arm of the inner pawl-carrying lever pivoted to the cup, which lever is not visible, however, in this view.

With every revolution of the shaft 23, it will be remembered, the ratchet-wheel 46 is advanced two teeth, or one tooth for each half-revolution or one reciprocation of the rider. As the ratchet-wheel thus advances, its tendency is to advance or rotate the type-cylinder with it, the latter being coupled thereto by the pawls 60 and 61 of the lever 59; but it must be remembered that for printing only one line of type the free end of the pawl-releasing screw 72 (see Fig. 14) is set to contact with the tripping-arm 63 of said lever, and as the ratchet-wheel 46 is thus advanced from tooth to tooth the said screw keeps bearing on the said tripping-arm, keeping the pawls 60 and 61 out of engagement during the moment of advance of said ratchet-wheel, so that the ratchet-wheel and disk 50, carrying the same, revolve together within the band 53, leaving the type-cylinder behind them, that is to say, the type-cylinder remains stationary, and the impression-roller 15 can thus reciprocate along the same type-line presented to it and reproduce the impression thereof any suitable number of times on any sheet of paper or other surface interposed and fed between the type-cylinder and the ink-ribbon. Where only one line of type is to be set up, the free end of a spring index-arm 125, (see Figs. 1, 2, and 3,) secured to the arm 76 immediately over the band 53, points to the figure "1" on said band, the parts being so adjusted that when the screw 72 and tripping-arm 63 are in contact, as above described, the said index-arm will point to "1" on the number-band 53. Let us suppose, however, that the operator desires to set and print, for example, five lines of type from the type-cylinder. In that event five lines of type are set up on the cylinder, and the band 53 is moved or revolved until the index-band points to the numeral "5" on said band 53. The band is then set or secured against rotation by the post 76, as already described. When the index-arm points to the numeral "5," this shows that by the adjustment or shifting of the band to this position the free end of the pawl-releasing screw 72 has been removed five spaces or lines from the tripping-arm 63. In other words, the ratchet-wheel 46 and the type-cylinder coupled to it must advance five spaces or lines before the screw 72 and tripping-arm 63 come together again. (It must be remembered in this connection that the spaces between the numbers on the band 53 coincide with the distances both between the teeth on the ratchet-wheel 46 and the double reverse series 55 and 56 of the disk 50.) So that, if we begin to take an impression from the five lines set up, the impression-roller 15 on its first trip passes over the first line of type set up. At the end of its first trip the ratchet-wheel 46 is advanced one tooth, as is also the type-cylinder now coupled to it, by the pawls 60 and 61, and as the roller 15 is making its return trip it thus traverses the second line of type set up. Then in the same way it traverses the third, fourth, and fifth line. At the end of the fifth line, that is to say, just before the beginning of the sixth, the ratchet-wheel 46 advances one tooth or line, but the type-cylinder no longer advances with it, being by this time uncoupled or released from the ratchet by reason of the fact that at the proper moment the screw 72 presses against the tripping-arm 63, releasing the pawls 60 and 61, which serve to couple the cylinder to the disk carried by the ratchet-wheel. At this juncture, therefore, the type-cylinder (including the cups 57 and 79, the type-bars, and core 68) is again free to rotate on the shaft 67 independently of the ratchet-wheel 46 and disk 50, to which it had been temporarily coupled during the feeding of the five lines previous.

To be sure, the type-cylinder can only rotate independently, as just stated, only while the pawls 60 and 61 are out of engagement with the reversely-tending adjacent series of ratchet-teeth 55 and 56; but when said pawls are once out of engagement, if the cylinder be suddenly turned in a reverse direction to which it was advanced during the operation of the machine, it can be swung back so as to bring the first type-line set up to its original position above the line or path in which the reciprocating roller 15 travels before the pawls 60 and 61 actually have time to reëngage with their respective ratchet-teeth. Of course such a sudden reverse motion must be done very quickly, for otherwise the pawls might reëngage with their ratchet-teeth before the first type-line is brought into position, necessitating the turning back of the ratchet-wheel 46 the necessary number of spaces to bring the lines of type to their original position for the reproduction of the next impression thereof.

Figure 1:
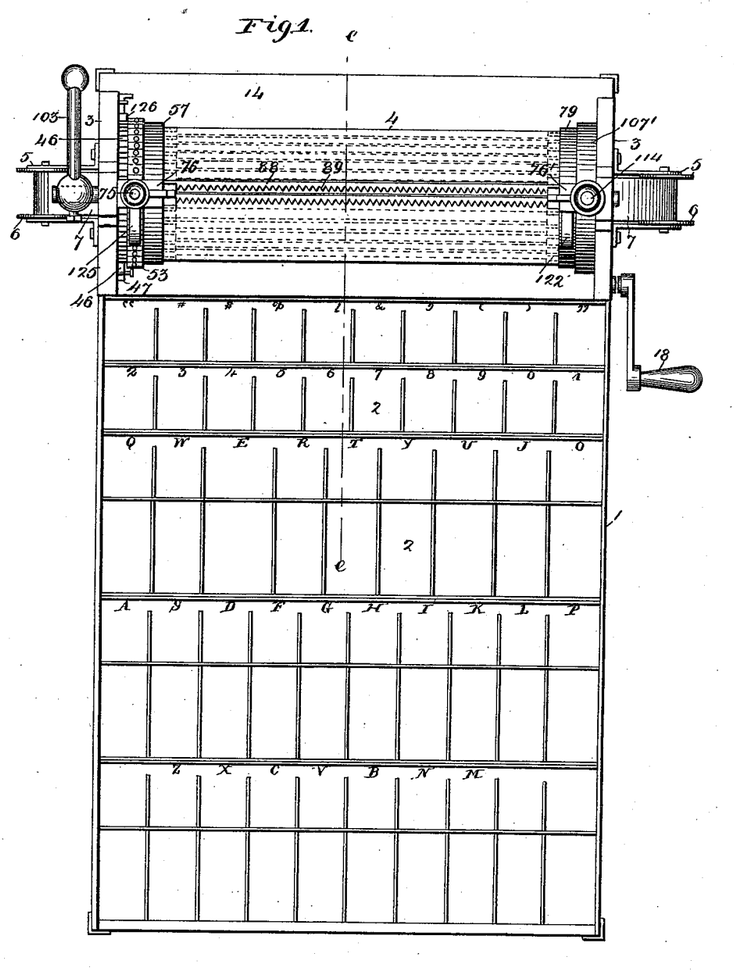
Figure 1 is a plan view of our complete invention.
Figure 2:
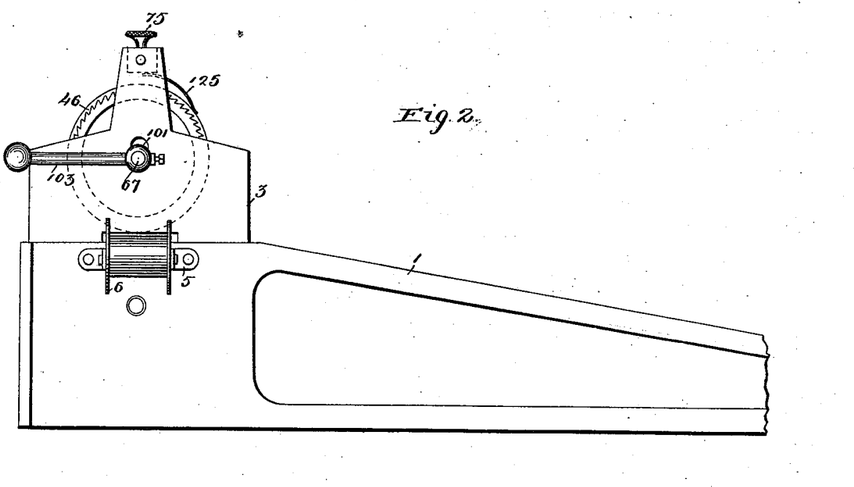
Fig. 2 is a side elevation thereof.
Figure 3:
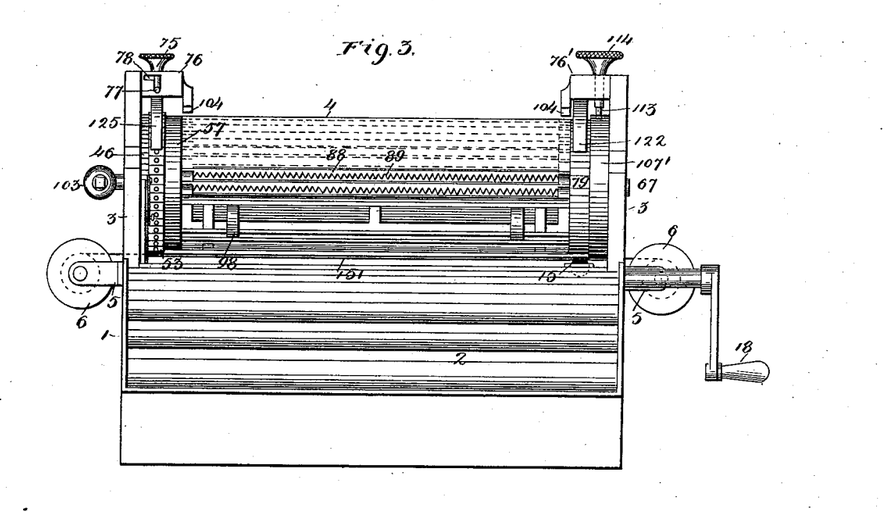
Fig. 3 is a front elevation of the same.
Figure 4:
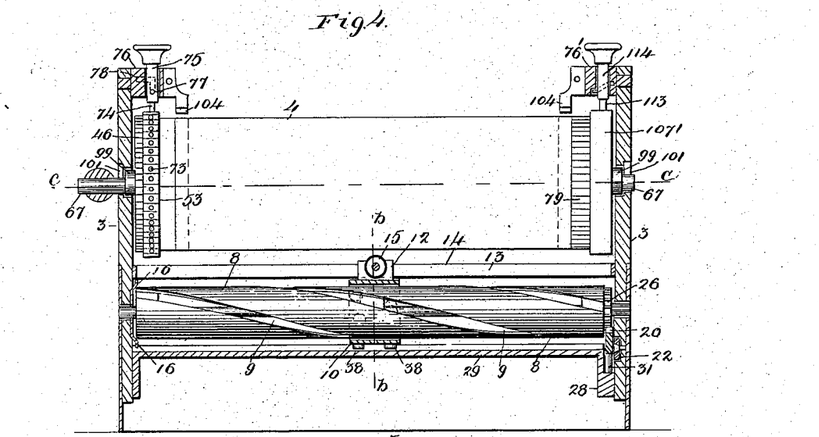
Fig. 4 is a combined section and elevation taken on the line $a\,a$ of Fig. 12.
Figure 5:
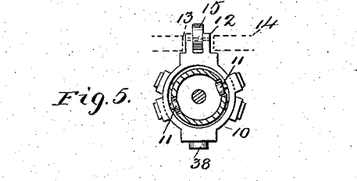
Fig. 5 is a section taken through the oscillating cylinder and rider carried thereby, being on the section $b\,b$ of Fig. 4.
Figures 7, 8, 9, 10, 11, 12:
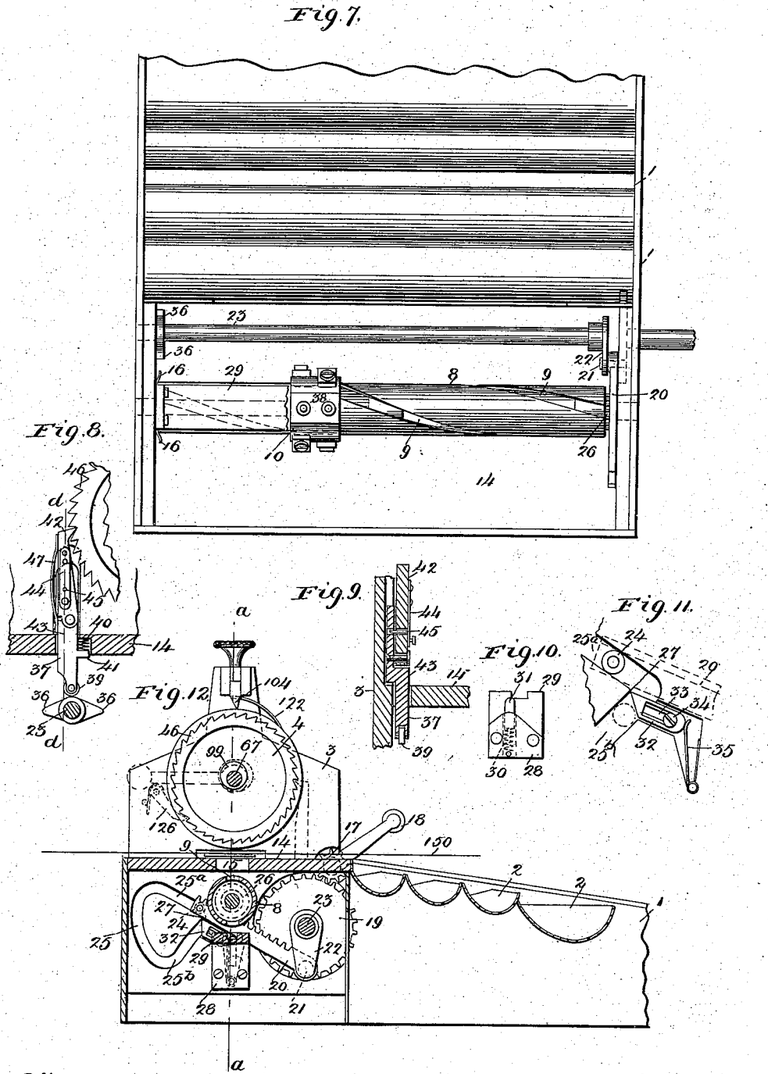
Fig. 7 is a bottom plan view of our invention with part of the type-casing broken away.
Fig. 8 is a detail in elevation showing the feed ratchet-wheel for the type-cylinder and the pawl coöperating with said ratchet.
Fig. 9 is a section on $d\,d$ of Fig. 8.
Fig. 10 is a detail of one end of the bottom brace bar or plate, showing therein the spring-controlled pin which assists the rack-bar that controls the oscillating cylinder.
Fig. 11 is an enlarged detail view of that portion of the inner surface of the side wall of the case which carries the guide-loop for the rack-bar above referred to, showing the sliding latch at the meeting portion of the ends of the loop.
Fig. 12 is a vertical section on $e\,e$ of Fig. 1 with type-cylinder in side elevation.
Figure 13:
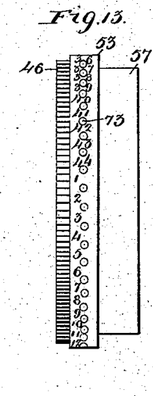
Fig. 13 is an elevation of the terminal ratchet-wheel for the type-cylinder, the terminal cup secured thereto, and the number-band embracing the disk interposed between the cup and ratchet-wheel, but which disk does not appear in said figure.

As a movement of the ratchet-wheel 46 reverse to that already described would be objectionable (the said ratchet being prevented in fact from turning in the wrong direction by a spring-controlled pawl 126, as seen in Figs. 1 and 12) to accomplish the purpose of bringing the type-cylinder back to its original position for making any succeeding or duplicate impression where several lines of type are set up, we accomplish the sudden independent return of the type-cylinder to its original position, as above referred to, by the following mechanism:

Passed loosely over the head of the hollow binding-screw 80 at the opposite end of the type-cylinder is a terminal disk 107', having an inwardly-projecting peripheral flange 108', and having disposed about its central opening an inwardly-projecting annular wall 109'. Within the chamber thus formed between this wall 109' and the outer walls of the cup 79 is adapted to be inserted a coiled spring 110, and being so wound as to have its inner end secured to the outer surface of the wall 109' and the opposite end to the inner surface of a ring 111, the latter having suitable screw-threaded depressions formed about its outer periphery for the reception of screws 112, which secure said ring to the walls of the cup 79, and consequently through the latter securing said ring to the type-cylinder. Again, the ring being secured to the outer disk 107' by means of the coiled spring 110, the outer disk becomes thus secured to the type-cylinder. Now, if we hold the disk 107' stationary and revolve the type-cylinder in the direction it ordinarily takes in the operation of the machine, such rotation or feeding of the cylinder would have a tendency to and in fact does wind up the spring 110, inasmuch as the ring 111 is carried around with the type-cylinder, being secured thereto by the screws 112. Now the moment that the type-cylinder is released from its engagement with the ratchet-wheel 46 upon the disengagement of the pawls 60 and 61 the coiled spring 110, which of course has a tendency to unwind, will suddenly throw or swing the type-cylinder back to its original position, so that a new or succeeding impression can be taken of the several lines of type set up. During the feeding of the type-cylinder by the pawl 42 the disk 107' is held stationary by the pin 113 at the end of the vertically-movable post 114, carried by the projecting arm 76', and operating substantially the same as post 75. The pin 113 is adapted to enter a depression 115 in said disk, and thus hold the latter firmly against rotation during the revolution of the type-cylinder.

To prevent a too violent return of the cylinder under the action of the coiled spring 110, an arrangement to properly cushion the suddenness of the impact at the moment of the return of the cylinder to its original position is effected by the application of a suitable combined buffer and brake band, which is constructed as follows: Cut in the periphery of the ring 111, adjacent to the inner surface of the disk 107', is a groove 116, extending almost entirely around said ring, with the exception of the solid portion 117. Over this groove is adapted to pass loosely but snugly an open band 118, having an enlarged end 119, which fits into an opening cut from the flange 108' of the disk 107' for its reception, said end being secured to the disk 107' by screws 120 or equivalent fastening devices. The opposite end of the open band is provided with an inwardly-projecting lug 121, which is received by the groove 116 referred to. The open band 118 is resilient and elastic. Now during the operation of the type-cylinder we have seen that the disk 107' is held stationary, and, as the band 118 is secured to it, this will also be stationary. As the cylinder advances in the operation of printing the ring 111, we have seen, will rotate, thereby carrying the solid portion 117, located between the terminals of the groove 116, away from the inwardly-projecting lug 121 of the open band with which it is normally in contact. When thereafter the cylinder is suddenly returned to its normal position through the action of the coiled spring 110, the solid portion 117 strikes against the adjacent side of the lug 121, and, owing to the elasticity of the open band, the jar incident to the sudden return of the cylinder and the resulting impact against such lug is taken up. Furthermore, as the lug 121 is thus struck the effect of the sudden contact is to force the open ends of the band to a closed position, the effect of such closing up of the band being to hug or tightly embrace the ring 111, secured to the type-cylinder, thus acting as a brake for the cylinder in this emergency.

Figures 21, 22:
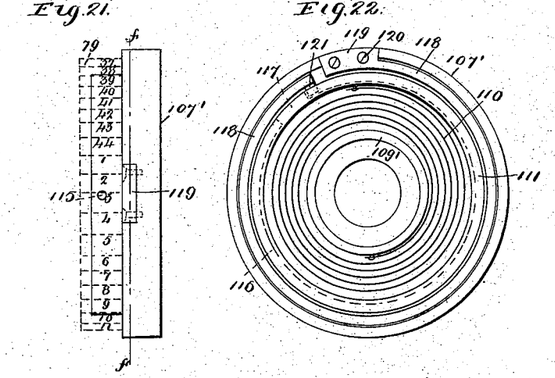
Fig. 21 is an elevation of the terminal disk carried at the opposite end of the type-cylinder, suitable numerals carried thereby, and the terminal cup coöperating with said disk.
Fig. 22 is an inner view of the said terminal cup, the brake-band carried thereby, the ring inside of said cup, and the coiled spring inside the ring.

In setting several lines of type it may be convenient for the operator to know how many lines have been set up without the necessity of counting them. For this purpose the cup 79 is provided with numerals properly spaced, as indicated in Fig. 21, a suitable spring-pointer 122 projecting from the arm 76' and coöperating with the same. As the type-cylinder is advanced or rotated in or during the process of type-setting the pointer will indicate the number of lines set up. This will then enable the operator to know just how many spaces he is to shift the number-band 53 to allow the cylinder to advance the correct number of lines before the pawl-releasing screw 72, carried by it, strikes or trips the arm 63 of the pawl-lever 59.

By examining the construction of each type it will be seen to be constructed so that it can be inserted between the type-bars only from one direction, there being therefore never any danger of the type being set up wrong. This is a very important feature of the present invention, since an inexperienced person can set up the type, which, by the way, is distributed among compartments 2, that correspond relatively to the location of the Remington keyboard. By the present device each line of the type surface or cylinder is printed by a roller or similar impression device passing over the several letters that constitute the line consecutively. Of course if the type-cylinder were made prismatic instead of cylindrical, or if the type-bars were disposed along a plane surface, the impression-roller, if correspondingly modified in construction, could be made to sweep or contact with two or more lines at a time without departing from the spirit of our invention.

The character of the type-surface is immaterial, it being remembered that the feed motion of said surface is transverse to the general direction in which the lines run, although it would not be departing from the spirit of the present invention if the type-surface were stationary and the reciprocating roller were consecutively fed from one line to the next succeeding one, or from one series of lines to a corresponding succeeding series, the object being in all cases to print any desirable number of communications by an impression-roller that traverses each line of type set up, and when one letter or imprint is finished to repeat such operation indefinitely at the will of the operator.

It will be observed that no specific means have been described whereby the ink-ribbon is advanced, nor any mechanism whereby the paper or other sheet introduced between the ribbon and impression-roller is fed. So far as the present device is concerned these are both fed and advanced by hand, although it is obvious that any mechanical means can be contrived which will automatically accomplish both these objects. The paper sheet can of course be fed between the ribbon and type-face, as illustrated in Fig. 12, where the numeral 150 represents the sheet of paper.

151 represents a cloth or similar band interposed between the roller 15 and the ink-ribbon to prevent the roller from gathering the ink off the ribbon. (See Fig. 3.)

Having described our invention, what we claim is—

1. In a printing-machine, a suitable printing-surface, type characters carried by the same, and an impression device adapted to reciprocate along the successive series of type-lines of said surface from one end of each line to the opposite end thereof, substantially as set forth.

2. In a printing-machine, a suitable type-cylinder, suitable type characters carried by the same, and an impression device adapted to reciprocate along the successive series of type-lines formed by said characters, from one end of the line to the opposite end thereof, substantially as set forth.

3. In a printing-machine, a suitable type-cylinder, means for periodically advancing or rotating said cylinder, a reciprocating impression device adapted to sweep over the lines of type of the cylinder thus successively advanced, and means for guiding the impression device in its sweep along the surface of the cylinder, substantially as set forth.

4. In a printing-machine, a suitable type-cylinder, means for periodically advancing or rotating said cylinder, a reciprocating rider carrying an impression-roller adapted to sweep over the lines of the cylinder thus advanced, means for guiding the rider during its sweep over the type-surface, and suitable mechanism for returning or swinging back the type-cylinder to its original position after a predetermined number of lines have been impressed by the rider, substantially as set forth.

5. In a printing-machine, a suitable type-surface, having type arranged in successive lines on said surface, means for periodically advancing said surface in a direction transverse to the general direction of the lines, a reciprocating impression device adapted to sweep the several lines from one end of each line to the opposite end thereof, and means for returning the printing-surface to its original position after a predetermined number of lines have been traversed by the impression device, substantially as set forth.

6. In a printing-machine, a suitable type-cylinder, means for periodically advancing or rotating said cylinder, a reciprocating rider carrying an impression-roller adapted to sweep over the lines of the cylinder thus advanced, means for guiding the rider in its sweep over the type-surface, suitable mechanism for returning or swinging the type-cylinder back to its original position after a predetermined number of lines have been traversed by the rider, and a brake mechanism for taking up the impact consequent upon the sudden return of the cylinder, substantially as set forth.

7. In a printing-machine, a suitable surface adapted to receive type, and suitable grooves or recesses for receiving the individual types and controlling the insertion of the same on said surface whereby the type will be set up always relatively in the same direction, said grooves serving also to space the individual types, substantially as set forth.

8. In a printing-machine, suitable type-bars arranged parallel to one another, means for retaining said bars in position, and a series of depressions disposed along one face of each bar whereby suitable type can be inserted between the bars and properly spaced, substantially as set forth.

9. In a printing-machine, suitable type-bars arranged parallel to one another, means for retaining said bars in position, a series of depressions disposed along one face of each bar, a ridge located on the adjacent face of the next succeeding bar, to properly hold type adapted to coöperate with said depressions and ridges, substantially as set forth.

10. In a printing-machine, a series of type-bars arranged parallel to one another, means for receiving and properly spacing suitable type between each pair of bars, and devices for partially spreading two adjacent bars apart for the easy introduction of said type, substantially as set forth.

11. In a printing-machine, a suitable cylinder having spiral peripheral guide-slots extending the length thereof, a suitable rider embracing said cylinder, antifriction-roller carried by the inner surface of the rider arranged in proper position to operate within the spiral guide-slots, a suitable guideway for the rider arranged parallel to the axis of the cylinder, and suitable means for oscillating the cylinder and simultaneously reciprocating the rider on the same, substantially as set forth.

12. In a printing-machine, a suitable cylinder, a pinion carried by the same, a rack-bar meshing with said pinion, a disk or wheel for imparting rotary motion to one end of the rack-bar, a looped guideway for the free end of the rack-bar whereby said free end is given a reciprocating motion or a motion of translation, and the cylinder carrying the pinion is oscillated thereby, substantially as set forth.

13. In a printing-machine, a suitable type-case, an operating-handle mounted therein, a pinion adapted to be rotated by said handle, a gear-wheel meshing with said pinion, a rack-bar having one end pivotally secured eccentrically to said gear-wheel, a looped guideway for the free end of said rack-bar, a cylinder having peripheral spiral slots mounted in proximity to the gear-wheel, a pinion carried by said cylinder meshing with the rack-bar, a rider reciprocated over the spiral cylinder, a second shaft mounted in proximity to the spiral cylinder, a crank-arm connecting said second shaft to the gear-wheel for rotating said shaft, a type-cylinder, suitable mechanism interposed between the second shaft and the type-cylinder for periodically advancing the latter whereby the rider can sweep along a new line on the type-cylinder with each reciprocation of said rider, substantially as set forth.

14. In a printing-machine, a suitable type-case, a looped guideway in one of the walls thereof, a rack-bar having a terminal roller operating within the guideway, a spring-controlled pin for assisting the rack-bar around the angle of the loop, and a spring-controlled slotted latch having a beveled terminal edge mounted at the angle of the loop to prevent the rack-bar from retracing its path in the same branch of the loop, substantially as set forth.

15. In a printing-machine, a type-case, a suitable rotating shaft, terminal arms running diametrically opposite to one another located at one end of the shaft, a vertically-moving feed-bar mounted in the type-case and operated by the terminal arms in one direction, a spring for returning the feed-bar in the opposite direction, a spring-operated pawl pivoted to the feed-bar, a type-cylinder mounted in the type-case, and a terminal feed ratchet-wheel temporarily coupled to the type-cylinder whereby the latter is advanced one tooth for each upward reciprocation of the feed-bar, substantially as set forth.

16. In a printing-machine, a type-cylinder, a main supporting-shaft for the same, a feed-ratchet at one end of the cylinder, a series of peripheral type-bars disposed parallel to the axis of the type-cylinder and constituting the type-receiving surface, a suitable core embracing the main supporting-shaft and serving to carry the type-bars, means for locking the type-cylinder to the feed-ratchet and periodically disengaging it from said ratchet, to allow for it a movement about the supporting-shaft independent of said feed ratchet-wheel, substantially as set forth.

17. In a printing-machine, a type-cylinder, a main supporting-shaft for the same, a feed-ratchet at one end of the cylinder, a series of peripheral type-bars disposed parallel to the axis of the type-cylinder and constituting the type-receiving surface, a suitable core embracing the main supporting-shaft and serving to carry the type-bars, means for locking the type-cylinder to the feed-ratchet to be advanced in unison with said ratchet in one direction, means for disengaging the type-cylinder from said ratchet-wheel, and a suitable spring for swinging the cylinder in a direction reverse to the feed motion of the ratchet, substantially as set forth.

18. In a printing-machine, a suitable supporting-shaft, a core loosely embracing said shaft, a series of parallel slits disposed about a portion of the periphery of said core, type-bar-supporting plates radiating from said slits, and type-bars carried by the outer ends of said plates, substantially as set forth.

19. In a printing-machine, a rotating type-cylinder, a supporting-shaft for the same, a suitable feed mechanism for said cylinder located at one end of the shaft, means for coupling the cylinder to said feed mechanism and subsequently uncoupling the same therefrom, a terminal disk at the opposite end of the shaft, means for holding said disk stationary during the feeding of the cylinder, and a coiled tension-spring having one end secured to the disk and the other end to the type-cylinder for swinging the latter back to its original position upon the periodic disengagement of it from the feed mechanism, substantially as set forth.

20. In a printing-machine, a suitable supporting-shaft, a terminal feed ratchet-wheel mounted above the same, a disk secured to said ratchet-wheel, a band loosely embracing and guided about the periphery of said disk, means for holding said band stationary during the rotation of the ratchet-wheel and disk, adjacent series of oppositely-tending ratchet-teeth carried by said disk, a rotating type-cylinder mounted on the supporting-shaft, a spring-controlled lever having inwardly-projecting pawls adapted to engage with the oppositely-tending series of ratchet-teeth on said disk and thus lock the cylinder to said disk, a projecting tripping-arm carried by the pawl-lever, and a pawl-releasing device secured to the disk and adapted to contact with the tripping-arm and release said type-cylinder from the disk and ratchet-wheel, substantially as set forth.

21. In a printing-machine, a main supporting-shaft, a type-cylinder mounted loosely on the same, suitable feed mechanism for advancing the cylinder in one direction, means for releasing the cylinder from the feed mechanism, a terminal disk at the end opposite the feed mechanism, means for holding said disk stationary, a ring interposed between the terminal disk and adjacent end of the type-cylinder, means for securing said ring to the cylinder, a coiled spring confined within the ring and having one end secured to the outer disk and the other end to the ring, whereby upon release of the cylinder from the feed mechanism said spring may return the same to its normal or original position, substantially as set forth.

22. In a printing-machine, a rotating type-cylinder, a supporting-shaft for the same, a terminal disk adapted to be held stationary during the rotation of the cylinder, a ring carried by the adjacent end of the cylinder, a coiled spring having its ends secured respectively to the ring and the terminal disk, a peripheral groove in said ring extending the major distance about the ring, a solid portion separating the ends of said groove, an open band embracing the groove and having one end secured to the terminal disk and the other having a lug operating within the groove of the ring and adapted to be struck by the solid portion of the groove upon a sudden swing of the type-cylinder under the action of the spring, whereby a cushion is formed by the open band and at the same time a brake, the band tightly embracing the ring at the proper moment, substantially as set forth.

23. In a printing-machine, a type-cylinder comprising a suitable central core, terminal cups secured to the opposite ends of said core, a series of parallel peripheral slits disposed about the major portion of the outer surface of the core, type-bar-supporting plates radiating from said slits, the medial plate of the series being connected at opposite ends to the terminal cups, type-bars carried by the respective type-bar-supporting plates, suitable collars loosely embracing the core at either end interior to the terminal cups, arms projecting from said collars, brace-bars connecting the free ends of the arms and adapted to be opened apart in the open segment of the type-cylinder and brought to bear against the adjacent sides of the terminal type-bar-supporting plates of the series, and suitable spring-plates for retaining the brace-bars in an open position and furnishing an elastic or resilient background for the type-bar series, substantially as set forth.

24. In a printing-machine, a type-case, a suitable supporting-shaft, a rotatable type-cylinder mounted on said shaft, terminal disks eccentrically secured to the supporting-shaft, elliptical bearings for supporting said disks, vertically-elongated guide-slots formed in the case-walls opposite said bearings and to one side of the center of the elliptical bearings, means for imparting a partial rotation to said shaft, whereby the shaft and the cylinder carried thereby are raised and guided vertically, and suitable depending tips or wedges carried by the type-case adapted to enter between the type-bars of said cylinder upon raising of the latter and separate them to permit of the ready insertion of type between them, substantially as set forth.

25. In a printing-machine, a suitable core, a series of type-bar-supporting plates radiating from said core, a series of spring-supporting arms formed integrally with each plate, a shoulder formed at the base of each plate at its juncture with its supporting-arms, a series of longitudinal ridges formed in the plates on the side adjacent to the shoulders, a type-bar secured to the face opposite the face carrying the ridges, suitable parallel depressions disposed throughout the width of the type-bars for the reception of suitable type, and terminal blocks at each end of the type-bars having bevel faces for the ready introduction of suitable separating-wedges, substantially as set forth.

26. In a printing-machine, a suitable type-cylinder, a feed-ratchet for the same, a disk secured to the ratchet, a number-band loosely embracing the disk, suitable depressions formed in the periphery of the band and spaced to correspond with the spaces between the teeth and also with the spaces between the lines disposed on said type-cylinder, a post carried by the type-case adapted to hold the number-band stationary during the feeding of the type-cylinder, means for releasing the type-cylinder from the feed-ratchet and an index-arm coöperating with the numbers on the band to designate the number of spaces the cylinder is to advance before returning to its original position, substantially as set forth.

27. In a printing-machine, a suitable supporting-shaft, a revoluble type-cylinder mounted thereon, a series of type-bars disposed peripherally about the cylinder, means for bodily elevating the cylinder, and suitable devices for separating the type-bars from each other upon elevation of the type-cylinder to allow for the easy insertion of type between the bars, substantially as set forth.

28. In a printing-machine, a suitable rotating type-cylinder, a band loosely embracing one end of the same, means for holding said band stationary during the rotation of the cylinder, a coiled spring tending to swing the cylinder in a direction reverse to its normal advance, and a releasing device on said band for releasing the cylinder from its feed mechanism and permit the spring to swing the cylinder in said reverse direction, substantially as set forth.

29. In a printing-machine, a series of type-bars, means for retaining the same at predetermined distances apart from one another, and suitable devices for temporarily spreading the bars from one another to allow for the introduction of suitable type, substantially as set forth.

30. In a printing-machine, a type having a suitable body or base portion, a bevel edge on one side of said base, and a series of depressions on the opposite side of said base to permit such type to be always inserted properly between suitable type-bars adapted to receive the same, substantially as set forth.

In testimony whereof we affix our signatures in presence of two witnesses.

FRANK P. SLANE.
C. O. SOBINSKI.

Witnesses:
ALFRED A. MATHEY,
EMIL STAREK.